(12) United States Patent
Patten (10) Patent No.: US 9,731,897 B2
(45) Date of Patent: Aug. 15, 2017

(54) GAS CONTAINMENT SYSTEM

(71) Applicants: Red Leaf Resources, Inc., South Jordan, UT (US); Total E&P USA Oil Shale, LLC, Houston, TX (US)

(72) Inventor: James W. Patten, South Jordan, UT (US)

(73) Assignee: Red Leaf Resources, Inc., Salt Lake City, UT (US)

( * ) Notice: Subject to any disclaimer, the term of this patent is extended or adjusted under 35 U.S.C. 154(b) by 0 days.

(21) Appl. No.: 14/880,795

(22) Filed: Oct. 12, 2015

(65) Prior Publication Data

US 2016/0101941 A1    Apr. 14, 2016

Related U.S. Application Data

(60) Provisional application No. 62/062,713, filed on Oct. 10, 2014.

(51) Int. Cl.
| | |
|---|---|
| *B65G 5/00* | (2006.01) |
| *E21D 11/00* | (2006.01) |
| *E21D 11/38* | (2006.01) |
| *E21D 13/00* | (2006.01) |

(52) U.S. Cl.
CPC .............. *B65G 5/00* (2013.01); *E21D 11/00* (2013.01); *E21D 11/38* (2013.01); *E21D 13/00* (2013.01)

(58) Field of Classification Search
CPC ........................................................ E21D 11/00
USPC .......... 405/55, 129.1, 129.45, 129.55, 129.6, 405/129.75, 129.95
See application file for complete search history.

(56) References Cited

U.S. PATENT DOCUMENTS

| | | |
|---|---|---|
| 2,191,312 A | 2/1940 | Cannon |
| 3,188,225 A | 6/1965 | Forbes |
| 3,639,233 A | 2/1972 | Baggett et al. |
| 4,367,163 A | 1/1983 | Pinnavaia et al. |
| 4,514,310 A | 4/1985 | Heilweil |
| 4,963,273 A | 10/1990 | Perricone et al. |
| 5,076,364 A | 12/1991 | Hale et al. |
| 5,198,416 A | 3/1993 | Hale et al. |
| 5,248,664 A | 9/1993 | Hale et al. |

(Continued)

FOREIGN PATENT DOCUMENTS

| | | | |
|---|---|---|---|
| DE | 2909125 | * | 9/1980 |
| JP | 61141783 | * | 6/1986 |
| RU | 2274651 C | | 4/2006 |

OTHER PUBLICATIONS

R.L. Anderson et al., Clay swelling—A challenge in the oilfield, Earth-Science Reviews Journal, Feb. 2010, pp. 201-216, vol. 98—Issues 3-4, Elsevier, Published online.

(Continued)

*Primary Examiner* — Sean Andrish
(74) *Attorney, Agent, or Firm* — Thorpe North & Western, LLP (57) ABSTRACT

A gas containment system can include a gas barrier layer forming a capsule. The gas barrier layer can be made up of a particulate swelling clay, a non-swelling particulate material mixed with the particulate swelling clay, water, and a water-soluble polyol. The water can hydrate the particulate swelling clay and form a continuous liquid phase in the gas barrier layer. The water-soluble polyol can be dissolved in the water. The gas containment system can further include a gas retained inside the capsule.

16 Claims, 4 Drawing Sheets

(56) References Cited

U.S. PATENT DOCUMENTS

| | | | |
|---|---|---|---|
| 5,330,785 A * | 7/1994 | Plaisted | C04B 24/045 |
| | | | 405/264 |
| 5,607,901 A | 3/1997 | Toups, Jr. et al. | |
| 5,662,983 A | 9/1997 | Stark | |
| 5,673,753 A | 10/1997 | Hale et al. | |
| 6,105,691 A | 8/2000 | Hayatdavoudi et al. | |
| 6,291,405 B1 | 9/2001 | Lee et al. | |
| 7,647,971 B2 * | 1/2010 | Kaminsky | E21B 36/001 |
| | | | 165/45 |
| 7,862,705 B2 | 1/2011 | Dana | |
| 2004/0067107 A1 * | 4/2004 | Barrie | B09B 3/00 |
| | | | 405/129.45 |
| 2011/0138649 A1 | 6/2011 | Patten | |
| 2012/0040873 A1 | 2/2012 | Pomerleau | |
| 2014/0216561 A1 | 8/2014 | Tanaka | |

OTHER PUBLICATIONS

Craig H. Benson et al., Hydraulic Conductivity of Thirteen Compacted Clays, Clays and Clay Minerals, 1995, 669-681, vol. 43, No. 6, Dept of Civil and Environmental Engineering, University of Wisconsin-Madison, Madison Wisconsin.

Matthew R. Cawley, Compacted Clay Liners—A Viable Solution for Landfill Leachate Containment, Brigham young University; Civil Engineering 540 Winter Semester 1999; Provo, UT.

* cited by examiner

GAS CONTAINMENT SYSTEM

RELATED APPLICATION

This application claims priority to U.S. Provisional Application No. 62/062,713 filed Oct. 10, 2014 entitled "Gas Containment System," which is incorporated herein by reference.

FIELD OF THE INVENTION

The present invention relates to gas containment systems and methods for containing gas in an enclosed volume. More specifically, the gas containment systems can include gas barriers containing swelling clays to reduce permeability of the barriers. Therefore, the invention relates to the field of gas containment.

BACKGROUND

Compacted clay liners have been used in municipal and hazardous waste landfills. Typically, soils rich in clay are used for constructing compacted clay liners because soils rich in clay have low hydraulic conductivities. Many regulatory agencies require compacted clay liners in landfills to have hydraulic conductivities less than $10^{-9}$ m/s. The hydraulic conductivity of compacted clay liners can vary depending on the composition of the clay, the composition of the soil, water content in the clay, and method of compaction. Low hydraulic conductivities allow the liners to prevent seepage of pollutants out of the landfills. Compacted clay liners are typically formed by spreading a layer of clayey soil and compacting the layer with a roller. Very high pressures are often applied to the soil to ensure that the soil is well compacted so that the hydraulic conductivity is sufficiently low. Heavy compactors weighing over 18,000 kg are often used to compact the soil layers. The compactors can have footed rollers, such as a sheep's foot roller. These rollers have small protruding feet which concentrate the compactive energy of the roller into a small area.

Geosynthetic clay liners are another type of liner used to control seepage out of landfills. Typically, geosynthetic clay liners are made by enclosing bentonite or another expansive clay between two layers of geosynthetic textile. The layers can be bonded together with adhesive or held together by stitching or other fasteners. This forms a blanket-like sheet that can be placed in a landfill as a hydraulic barrier. Sometimes geosynthetic clay liners are used in place of or in addition to a compacted clay liner. Both clay liners can be used in combination with geomembranes and geogrids to provide additional impermeability and structural strength.

Various combinations of soil composition, moisture content, and compaction methods have been used in attempts to minimize the hydraulic conductivity of clay liners. With proper care and maintenance, clay liners can provide low hydraulic conductivities such as below $10^{-8}$ m/s or $10^{-9}$ m/s. However, clay liners are vulnerable to becoming more permeable in certain situations. Non-homogenous elements, such as soil clods in a compacted clay liner, can increase the hydraulic conductivity of the liner. Additionally, interfaces between layers of clay can create pathways of higher hydraulic conductivity through which fluids can seep. Because moisture content can affect the permeability of the liner, changes in moisture content occurring over time can alter the hydraulic conductivity of the liner. Measures used to prevent drying of clay liners have included limiting the exposure of the liner to atmosphere or periodically spraying the liners with water. However, spraying with water can potentially increase the hydraulic conductivity of the liners if the liners become too wet.

SUMMARY

The present technology relates to systems and methods for containing a gas. For example, a gas containment system can include a gas barrier layer formed as a capsule containing a gas. In addition to the gas, liquid and solid materials can optionally be contained inside the capsule. The gas barrier layer can include a mixture of a particulate swelling clay and a non-swelling particulate material. This mixture can also include water and a water soluble polyol dissolved in the water. The water can hydrate the particulate swelling clay, causing the clay particles to swell. The swelling of the clay particles can decrease the permeability of the gas barrier layer. For example, the gas barrier layer can be sufficiently impermeable that the barrier exhibits diffusion controlled gas transport. The water can form a continuous liquid phase in the gas barrier layer.

Another example of a gas containment system can include a gas barrier formed from a particulate swelling clay, a non-swelling particulate material mixed with the particulate swelling clay, and glycerin. A gas can be retained inside the capsule. In one example, the capsule can be substantially devoid of water, with pure or nearly pure glycerin being mixed with the particulate swelling clay and the non-swelling particulate material.

A method of containing a gas within an enclosed volume can include forming a capsule surrounding the enclosed volume. The capsule can be formed from clay amended soil hydrated by a solution of water and a water-soluble polyol. A gas can be provided within the enclosed volume and the gas can be retained by the capsule. The capsule can have a hydraulic conductivity sufficiently low so that the capsule exhibits diffusion controlled gas transport. The hydraulic conductivity of the capsule can be maintained low enough to maintain diffusion controlled gas transport.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

DEFINITIONS

In describing and claiming the present invention, the following terminology will be used.

As used herein, "hydrocarbonaceous material" refers to any hydrocarbon-containing material from which hydrocarbon products can be extracted or derived. For example, hydrocarbons may be extracted directly as a liquid, removed via solvent extraction, directly vaporized, by conversion from a feedstock material, or otherwise removed from the material. Many hydrocarbonaceous materials contain kerogen or bitumen which is converted to a flowable or recoverable hydrocarbon through heating and pyrolysis. Hydrocarbonaceous materials can include, but are not limited to, oil shale, tar sands, coal, lignite, bitumen, peat, and other organic rich rock. Thus, existing hydrocarbon-containing materials can be upgraded and/or released from such feedstock through a chemical conversion into more useful hydrocarbon products.

As used herein, "spent hydrocarbonaceous material" and "spent oil shale" refer to materials that have already been used to produce hydrocarbons. Typically after producing hydrocarbons from a hydrocarbonaceous material, the remaining material is mostly mineral with the organic content removed. However, some amount of the original organic content can remain in the spent material, such as less than about 10%, less than about 20%, or less than about 30% of the original organic content.

As used herein, "lean hydrocarbonaceous material" and "lean oil shale" refer to materials that have a relatively low hydrocarbon content. Lean materials can in some cases be spent materials that have had hydrocarbons removed. In other cases, lean material can be mined from deposits that naturally have a lower hydrocarbon content. As an example, lean oil shale can typically have from 1% to 15% hydrocarbon content by weight.

As used herein, "compacted earthen material" refers to particulate materials such as soil, sand, gravel, crushed rock, clay, spent shale, mixtures of these materials, and similar materials. A compacted earthen material suitable for use in the present invention typically has a particle size of less than about 5 cm in diameter.

As used herein, "wall" refers to any constructed feature of a gas containment system that contributes to an impermeable gas barrier that allows retention of gases and other materials. Walls can be oriented in any manner such as vertical or sloped. Ceilings, floors, and other contours defining a capsule can also be "walls" as used herein.

As used herein, "polyol" refers to a chemical compound that is an alcohol having two or more hydroxyl groups. "Water-soluble polyol" refers to a polyol that can be dissolved in water in some proportion. Some water-soluble polyols can be completely soluble in water up to a solubility limit, e.g. greater than 500 g/L (20° C.). As used herein, "solution of water and water-soluble polyol" and the like refer to solutions containing water and a water-soluble polyol in a proportion such that the water-soluble polyol can be completely dissolved in the water.

As used herein, "glycerin" refers to a polyol having the chemical formula $C_3H_8O_3$. This compound is also commonly referred to as "glycerol" and "glycerin," including alternative spelling "glycerine." As used herein, these terms are considered to be synonyms for the same compound. Glycerin can be synthetic or produced from industrial processes such as biodiesel production. Glycerin purities ranging from crude (>70% pure) to refined (>99.5% pure) can be used with the present technology.

As used herein, "hydraulic conductivity" refers to a property of soil that is based on the ease with which water can move through pore spaces or fractures in the soil. Hydraulic conductivity can be calculated using the following formula:

$$K = \frac{QL}{Aht} \quad (1)$$

where K is the hydraulic conductivity, Q is a quantity of water measured, L is a length of a soil specimen through the water passes, A is a cross-sectional area of the specimen, t is the time required for the quantity Q to be discharged, and h is the pressure head of water driving the discharge. K can be expressed in units of m/s.

As used herein, "permeability" refers to another property of clay amended soil that relates to the ease with which a fluid can move through the clay amended soil. Permeability can be calculated using the following formula:

$$k = \frac{K_i \rho g}{\mu} \quad (2)$$

where k is the permeability, $K_i$ is the intrinsic permeability of the clay amended soil, $\rho$ is the density of the fluid passing through the clay amended soil, $\mu$ is the viscosity of the fluid passing through the clay amended soil, and g is the acceleration due to gravity. The permeability of clay amended soil is inversely proportional to the viscosity of the pore fluid or permeate. As used herein, "impermeability" refers to a lack of permeability or a very low permeability. However, "impermeability" is not intended to refer to a specific physical property or to have any specific units. High impermeability corresponds to low permeability.

As used herein, whenever any property is referred to that can have a distribution between differing values, such as a temperature distribution, particle size distribution, etc., the property being referred to represents an average of the distribution unless otherwise specified. Therefore, "particle size" refers to an average particle size, and "operating temperature" refers to an average operating temperature.

It is noted that, as used in this specification and in the appended claims, the singular forms "a," "an," and "the" include plural referents unless the context clearly dictates otherwise. Thus, for example, reference to "a layer" includes one or more of such features, reference to "a particle" includes reference to one or more of such elements, and reference to "producing" includes reference to one or more of such steps.

As used herein, the terms "about" and "approximately" are used to provide flexibility, such as to indicate, for example, that a given value in a numerical range endpoint may be "a little above" or "a little below" the endpoint. The degree of flexibility for a particular variable can be readily determined by one skilled in the art based on the context.

As used herein, the term "substantially" refers to the complete or nearly complete extent or degree of an action, characteristic, property, state, structure, item, or result. The exact allowable degree of deviation from absolute completeness may in some cases depend on the specific context. However, the nearness of completion will generally be so as to have the same overall result as if absolute and total completion were obtained. "Substantially" refers to a degree of deviation that is sufficiently small so as to not measurably detract from the identified property or circumstance. The exact degree of deviation allowable may in some cases depend on the specific context. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context. Additionally, adjacent structures or elements can in some cases be separated by additional structures or elements between the adjacent structures or elements.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing the system, or the related devices or methods, individual or separate descriptions are considered applicable to one other, whether or not explicitly discussed in the context of a particular example or embodiment. For example, in discussing a device per se, other device, system, and/or method embodiments are also included in such discussions, and vice versa.

Gas Containment Systems

The present technology provides systems and methods for containing gases within an enclosed volume. Generally, gas containment systems in accordance with the present technology can include a gas barrier layer comprising a clay amended soil. Clay amended soil can be made impermeable to gases and liquids by causing clay particles in the clay amended soil to swell. This can be accomplished by adding water or another liquid that causes the clay to swell. When the clay is hydrated and swells, the clay effectively plugs the spaces between soil particles, eliminating pathways for fluids to flow through the barrier layer.

One specific application of the present technology involves extracting hydrocarbon liquids and gases from hydrocarbonaceous materials such as oil shale, tar sands, coal, bitumen, peat, or other hydrocarbon-rich material. Hydrocarbon products can be extracted from these materials by heating the materials to a high temperature for an extended period of time. For example, oil shale can be heated to a sufficient temperature to pyrolyze kerogen contained in the oil shale, breaking the kerogen down into liquid and gaseous hydrocarbons that can be extracted. The process of heating oil shale and extracting hydrocarbons can take place in a capsule, such as is used in the In-Capsule® technology of Red Leaf Resources, Inc. and described in U.S. Pat. No. 7,862,705 which is incorporated herein by reference. In this process, crushed oil shale is placed in a capsule formed of earthen materials and then heated for a prolonged period of time to temperatures that cause decomposition of the kerogen in the oil shale. The capsule can be very large. For example, capsules can cover a land area of 5 acres or more, and can contain a bed of crushed oil shale about 50 meters deep. The oil shale within the capsule can be heated to temperatures up to 500° C. or more. These conditions can be effective for producing large quantities of hydrocarbons from oil shale.

However, the same conditions can also cause problems for a gas barrier formed of clay amended soil. The permeability of the gas barrier is at least partially related to the amount of water or other liquid hydrating the clay amended soil. Therefore, changes in water content in the barrier layer can affect the permeability. When heating oil shale to high temperatures, thermal energy can transfer from the oil shale to the gas barrier. This energy can cause water in the gas barrier to evaporate, dehydrating the clay amended soil. As the clay amended soil dehydrates, pathways for fluid flow can open up. Thus, the permeability of the gas barrier can increase and gases and liquids can escape through the barrier. To avoid dehydration of the gas barrier, steps can be taken to keep the temperature of the gas barrier low so that water does not evaporate from the gas barrier. For example, insulation can be placed between the hot oil shale and the gas barrier.

Additionally, the gas barrier can be formed by hydrating the clay amended soil with a mixture of water and another material that improves the characteristics of the gas barrier. For example, a solution of water and a water-soluble polyol can provide particularly improved impermeability in the gas barrier compared to water alone. Without being bound to a specific mechanism, it is believed that solutions of water and a water-soluble polyol can have a lower rate of evaporation at the temperatures to which the gas barrier is exposed. This can increase the range of temperatures at which the gas barrier can be used while maintaining sufficient impermeability.

Taking glycerin as merely one example of a water-soluble polyol that can be used in the present technology, mixtures of glycerin and water can have higher boiling points, lower vapor pressures, and lower rates of evaporation than water alone. For example, a solution of 70 wt % glycerin and 30 wt % water has a boiling point of 113.6° C. compared to the boiling point of pure water, 100° C. The same solution has a vapor pressure of 496 mm Hg at 100° C., compared to the vapor pressure of pure water, which is 760 mm Hg at 100° C. Because solutions of glycerin and water evaporate more slowly than pure water at the same temperature, using such a solution in a gas barrier layer can allow operation of the gas barrier layer at higher temperatures without compromising the impermeability of the gas barrier layer. Similarly, a gas barrier comprising a solution of water and a water-soluble polyol can be used for a longer period of time than a gas barrier comprising only water under the same conditions. This can be useful in the application of extracting hydrocarbons from hydrocarbonaceous material, where hydrocarbonaceous material is often heated for long periods of time on the order of weeks or months. Additionally, using a gas barrier layer comprising a solution of water and water-soluble polyol can allow for other design considerations such as a thinner barrier layer, a thinner insulation layer, higher production temperatures, and higher production pressures.

Another advantage of using water-soluble polyols in the gas barrier layer results from the tendency of water-soluble polyols to depress the freezing point of water. For example, a solution of 70 wt % glycerin and 30 wt % water has a freezing point of −38.9° C. compared to the freezing point of pure water at 0° C. Mixtures of clay amended soil with pure water can be unworkable at temperatures below 0° C. because the water freezes, making it impossible to form the clay amended soil mixture into a gas barrier layer. Further, such mixtures can result in barriers which freeze and more easily fracture during subsidence. By using a solution of water and a water-soluble polyol, the gas barrier can be formed at lower temperatures. Gas containment systems according to the present technology may be constructed in many locations where temperatures below 0° C. occur during the winter. Therefore, using solutions of water and water-soluble polyols allows the formation of gas barrier layers during a greater portion of the year than is possible with water alone.

Although advantages of the present technology have been described in relation to specific embodiments involving hydrocarbon extraction, the present technology can be used for many other applications. For example, gas barriers with high impermeability can be useful in: municipal and hazardous waste landfills; nuclear waste containment; solid, liquid, or gas storage applications; mineral extraction applications such as precious metal extraction from ore within a gas barrier capsule; large-scale chemical reactors; and others. Accordingly, the present technology is not limited by the specific embodiments described herein.

Figure 1A:
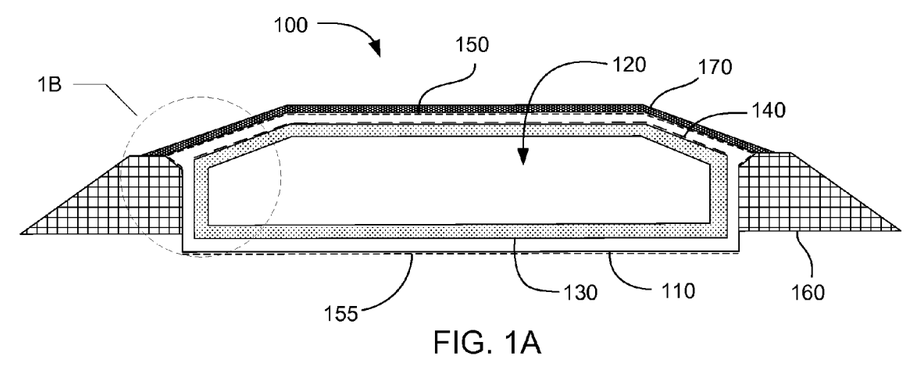
FIG. 1A is a cross-sectional side view of a gas containment system in accordance with an embodiment of the present technology.

With this general description in mind, FIG. 1A depicts an exemplary gas containment system 100. A gas barrier layer 110 forms a capsule around an enclosed volume 120. In the particular embodiment depicted, a layer of insulating material 130 is oriented on interior surfaces of the gas barrier layer. An optional geogrid layer 140 is designated by the dashed line between the insulating material and the gas barrier layer. Additionally, an optional geomembrane layer 150, designated in the figure by a dotted line, can be placed on the exterior surfaced of a crown portion of the gas barrier layer and another optional geomembrane layer 155 can be placed on an exterior bottom surface of the gas barrier layer. The gas containment system can have sidewalls supported by containment berms 160. A layer of cover soil 170 can be deposited on the top of the gas containment system.

Figure 1B:
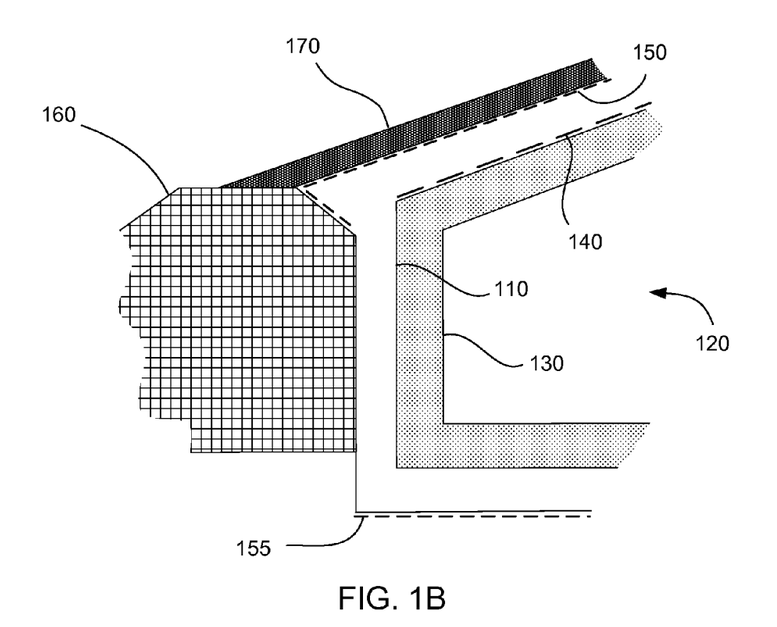
FIG. 1B is an expanded view of the encircled portion of the gas containment system depicted in FIG. 1A.

FIG. 1B shows an expanded view of the portion of FIG. 1A encircled by the dashed circle. This figure shows clearer detail of a portion of the gas containment system. The various layers of material making up the system include containment berms 160 providing support for the sidewalls of the capsule; a layer of cover soil 170 on the top of the capsule; geomembrane layers 150 and 155 on exterior surfaces of the crown portion and bottom of the capsule; the gas barrier layer 110 forming the capsule; and the enclosed volume 120 within the capsule, which includes a layer of insulating material 130 deposited on interior surfaces of the gas barrier layer. An optional geogrid layer 140 is designated by the dashed line between the insulating material and the gas barrier layer.

Figure 2:
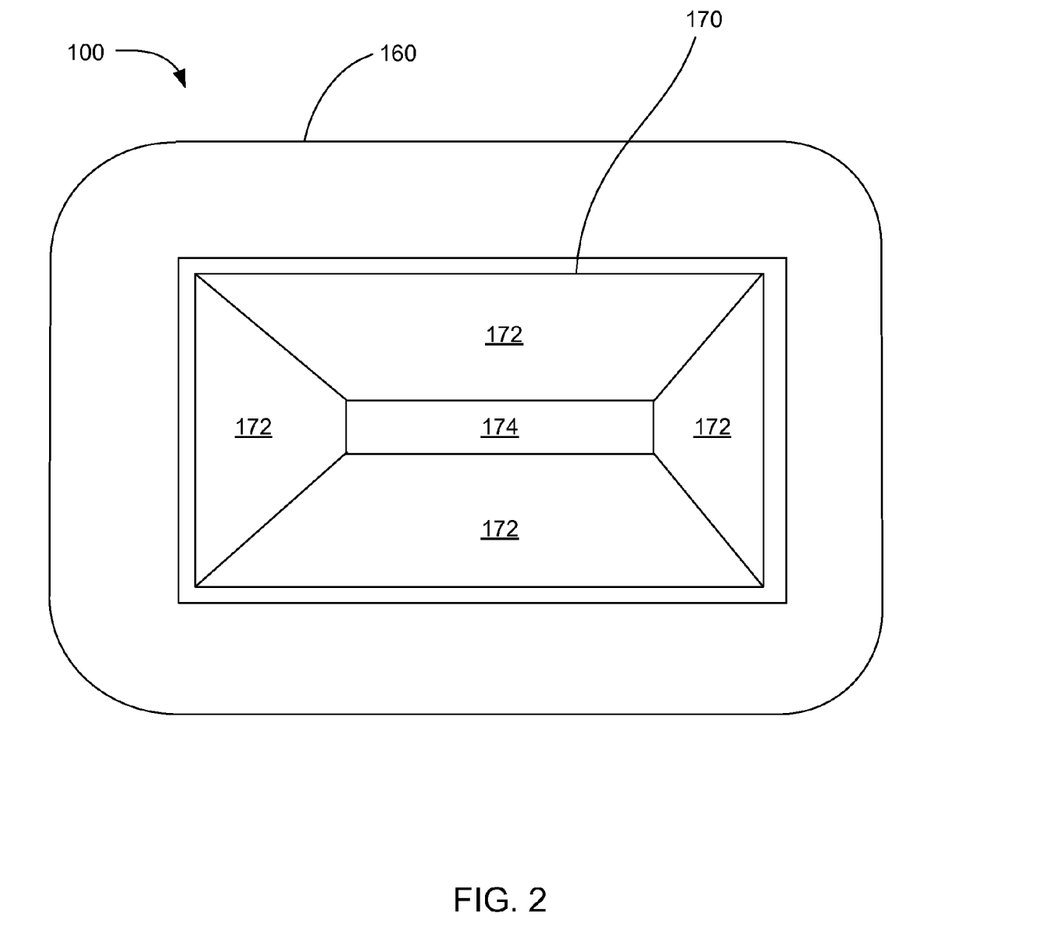
FIG. 2 is a top plan view of a gas containment system in accordance with an embodiment of the present technology.

FIG. 2 shows a top plan view of a gas containment system in accordance with an embodiment of the present technology. Containment berms 160 are positioned around the perimeter of the system. A layer of cover soil 170 is placed on the top of the system. As shown in the figure, the layer of cover soil comprises inclined surfaces 172 that terminate at a relatively horizontal upper surface 174. The inclined and horizontal surfaces of the cover soil layer are oriented roughly above a crown portion of the capsule within the gas containment system.

Although these figures show the structure and composition of certain embodiments of a gas containment system, the figures should not be considered to be limiting. Not all of the various layers of materials shown in the figures are necessarily required, and additional elements can be added to the gas containment system while still being within the scope of the present technology. The elements of the gas containment system can be rearranged or can have different shapes and appearances compared with the embodiment shown in the figures. For example, FIG. 2 shows a gas containment system that is roughly rectangular in shape. Other embodiments can have other shapes, such as square, round, irregular polygon, or any other desired shape. Furthermore, sizes, thicknesses, distances, and other dimensions shown in the figures are not necessarily drawn to scale. In any case, these dimensions can vary between different embodiments of the present technology. With this in mind, embodiments of the present technology are described in more detail below.

Gas containment systems in accordance with the present technology can generally be used to retain a gas inside an enclosed volume. In addition to gas, however, the systems can also be used to retain liquids and solids. Depending on the application, a gas containment system can contain any combination of solid, liquid, and gaseous materials. In one particular embodiment, the system can contain all three simultaneously: solid, liquid, and gas. Gases and liquid vapors are generally the most difficult to contain, because of the tendency of gases and vapors to expand to fill the volume of its container as well as higher rates of diffusion and smaller molecular sizes of most gases. Therefore, a gas containment system that is effective at retaining gases can also be effective at retaining solids and liquids.

In some applications it can be more important to prevent entrance of gases or liquids into the system than to prevent escape of materials from within the system. For example, when the contents of the gas containment system are reactive with air or can be contaminated by air or ground water, the gas containment system can be used to keep out air and water in the environment. Accordingly, the gas containment system can be effective at preventing passage of gases and liquids in both directions, whether into or out of the system.

The gas containment system can include a gas barrier layer forming a capsule. As shown in FIGS. 1A-1B, the gas barrier layer 110 can surround an enclosed volume 120. The gas barrier layer can be formed in any shape that encloses an interior volume. In some embodiments, the gas barrier layer can comprise a floor, sidewalls, and a ceiling or crown portion. The floor can be a substantially horizontal layer at the bottom of the capsule. In some cases, the floor can be supported by existing surface topography in the location where the capsule is constructed. For example, the floor can conform to topographical features such as hills, depressions, and so on. When a capsule is constructed on an incline, the floor can follow the same incline. Alternatively, the existing topography can be smoothed out to allow for a smoother floor and/or desirable floor slope. In one embodiment, the floor can be sloped toward a drain to allow drainage of liquids inside the capsule.

In some embodiments, a pit can be excavated and the floor of the capsule can be formed in the pit. Thus, the floor can be supported by the bottom and walls of the pit. In one embodiment, the pit can be excavated in a solid rock formation, so that the floor is supported by exposed undisturbed formation on interior surfaces of the excavated pit. The pit can be excavated to depths from about 1 m to about 10 m deep. Depending on the thickness of the floor of the capsule, the floor can be entirely below grade, approximately even with the existing grade, or above grade. Additionally, the floor can be supported by other support materials, such as geogrids or geomembranes. FIGS. 1A-1B show the floor of the gas barrier layer 110 supported by a geomembrane 155. The geomembrane, in turn, is supported by the earth beneath the capsule.

The floor is not necessarily a separate piece from the sidewalls and ceiling of the capsule. The floor, sidewalls, and ceiling can all be portions of a continuous gas barrier layer. The floor can generally be defined as the bottom face of the capsule that is supported by earth or formation beneath the capsule. Sidewalls can extend upward from the perimeter of the floor and connect to the ceiling at the top of the capsule. In some embodiments, the sidewalls can be substantially vertical. In other embodiments, the sidewalls can be sloped.

As shown in FIGS. 1A-1B, the gas barrier layer 110 can have sidewalls that extend upward from the floor and are at least partially supported on an exterior face of the sidewalls by containment berms 160. The containment berms can extend around the perimeter of the capsule, as shown in FIG. 2. The containment berms can be built up of earthen materials. For example, containment berms can comprise gravel, crushed rock, boulders, crushed spent oil shale, crushed lean oil shale, tailings, compacted earth, gabions, and other earthen materials. Containment berms can also contain geomembranes, woven textiles, non-woven textiles, geogrids, and other supporting material. In alternative embodiments, the capsule can be constructed in an excavated pit and the sidewalls can be supported by walls of the pit instead of by containment berms.

The sidewalls can be supported on the interior of the capsule by materials within the capsule. In the embodiment shown in FIGS. 1A-1B, the sidewalls are supported on the interior of the capsule by a layer of insulating material 130. The sidewalls can also be supported by other particulate materials within the capsule.

The ceiling, or crown portion, of the capsule can be substantially supported by materials within the capsule. FIGS. 1A-1B show the ceiling supported by a layer of insulating material 130 and a geogrid 140. In some embodiments, the ceiling can include sloped portions, such as the sloped portions 172 shown in FIG. 2. These sloped portions can rise up from the sidewalls of the capsule and terminate at an upper surface 174. This configuration of the ceiling allows the ceiling to flatten somewhat in the event of subsidence of materials within the capsule. For example, in hydrocarbon recovery processes and other processes involving production of a product from a particulate material within the capsule, the material inside the capsule can subside over time. If this occurs, the ceiling can flatten and thicken as the material beneath it subsides. This allows the ceiling to maintain impermeability without cracking or rupturing.

The capsule can be constructed using any suitable approach. However, in one aspect, the capsule is formed from the floor up. The formation of the walls, containment berms, and filling the interior of the capsule with particulate material can be accomplished simultaneously in a vertical deposition process where materials are deposited in a predetermined pattern. For example, multiple chutes or other particulate delivery mechanisms can be oriented along corresponding locations above the deposited material. By selectively controlling the volume of particulate delivered and the location along the aerial view of the system where each respective particulate material is delivered, the layers and structure can be formed simultaneously from the floor to the ceiling. The sidewall portions of the capsule can be formed as a continuous upward extension at the outer perimeter of the floor and each layer present, including any particulate material in the interior of the capsule, an insulating layer if present, the gas containment barrier, and containment berms, are constructed as a continuous extension of the floor counterparts. During the building up of the sidewalls, particulate material can be simultaneously placed on the floor and within the sidewall perimeter such that, what will become the enclosed volume, is being filled simultaneously with the rising of the constructed sidewall. In this manner, internal retaining walls or other lateral restraining considerations can be avoided. This approach can also be monitored during vertical build-up in order to verify that intermixing at interfaces of layers is within acceptable predetermined tolerances (e.g. maintain functionality of the respective layer). For example, excessive intermingling of the gas barrier layer with the insulating material in the insulating layer may compromise the sealing function of the gas barrier layer. This can be avoided by careful deposition of each adjacent layer as it is built up and/or by increasing deposited layer thickness. Hydrated materials in the gas barrier layer can be deposited dry and then hydrated after the capsule is complete. Alternately, a first horizontal layer of dry material can be deposited, followed by hydrating the layer, and then another layer of dry material can be deposited on top of the first layer, and then hydrated, and so on.

The gas barrier layer can comprise a mixture of a particulate swelling clay with a non-swelling particulate material, water hydrating the particulate swelling clay and forming a continuous liquid phase in the gas barrier layer, and a water-soluble polyol dissolved in the water. The gas barrier layer can be impermeable to fluids including vapors, gases, and liquids. Non-limiting examples of suitable swelling clays for use in forming the gas barrier layer can include bentonite clay, montmorillonite, kaolinite, illite, chlorite, vermiculite, and others. Non-limiting examples of non-swelling particulate materials can include soil, sand, gravel, crushed rock, crushed spent oil shale, crushed lean oil shale, and others. In one embodiment, the gas barrier layer can comprise soil amended with a swelling clay. For example, the gas barrier layer can comprise bentonite amended soil. Bentonite amended soil can be hydrated by adding a solution of water and water-soluble polyol, which causes the particles of bentonite to swell. The hydrated bentonite particles and the other particles present in the soil form an impermeable matrix that is an effective barrier to vapors and liquids. In some cases, bentonite amended soil can comprise, by weight, about 5-20% bentonite clay; 15-20% polyol solution; and the remainder soil or aggregate. When hydrated, the bentonite component swells to several times the dry volume of the bentonite clay thus sealing the soil such that this material is plastic and malleable. Additional materials that can optionally be included in the gas barrier layer can include compacted fill, refractory cement, cement, grout, high temperature asphalt, sheet steel, sheet aluminum, synthetic geogrids, fiberglass, rebar, hydrocarbon additives, filled geotextile bags, polymeric resins, PVC liners, or combinations thereof. For large scale operations forming the gas barrier layer from a majority of earthen material can provide an effective barrier.

The gas barrier layer can form a capsule to restrict passage of fluids into or out of the capsule. In embodiments involving hydrocarbon extraction, hydrocarbon fluids produced from hydro carbonaceous material inside the capsule can be retained inside the capsule to avoid contamination of the environment outside the capsule and loss of valuable hydrocarbon products. In some embodiments, the capsule can prevent substantially all passage of hydrocarbons outside the capsule except through designated conduits such as gas and liquid hydrocarbon outlet conduits. Such outlet conduits can include one or more drains in a lower portion of the capsule for draining liquid hydrocarbons, one or more gas outlets in an upper portion of the capsule for withdrawing gases and vapors, one or more intermediate outlets located at intermediate heights within the capsule for withdrawing hydrocarbon liquids and gases with various boiling points, or combinations of these different outlets. Outlet conduits can penetrate through the gas barrier layer to allow hydrocarbon products to be collected from the capsule. The area of the gas barrier layer immediately surrounding the conduit can be sealed against the exterior surfaces of the conduit so that no leakage of hydrocarbons occurs at the interface between the conduit and the gas barrier layer.

Additionally, the capsule can restrict passage of air, water, or other fluids into the capsule from the surrounding environment. Leakage of air into the capsule can potentially cause problems with the process of recovering hydrocarbons from hydrocarbonaceous materials. For example, the presence of oxygen can result in polymerization and gumming of the hydrocarbons and other contents within the capsule. Further, the presence of oxygen can induce combustion within the system. In some embodiments, the capsule can prevent substantially all passage of fluids into the capsule from the surrounding environment, with the exception of optionally feeding fluids into the capsule through designated inlet conduits. In some cases inlet conduits can be used to introduce heated gases into the capsule to heat hydrocarbonaceous material within the capsule. In one such example, heating conduits can be used to introduce hot combustion gas into the capsule. Other fluids that can be introduced into the capsule through inlet conduits include, but are not limited to, steam, inert or non-oxidizing gases, solvents, hydrocarbons, catalysts, and so on. Accordingly, the capsule can prevent passage of fluids in either direction, either into or out of the capsule, with the exception of designated inlet and outlet conduits.

The gas barrier layer can have a thickness sufficient to prevent leakage of fluids into or out of the capsule. In one example, the gas barrier layer can have a thickness from about 10 cm to about 2 m. In another example, the gas barrier layer can have a thickness from about 50 cm to about 1 m. Additionally, the capsule can be constructed to any desired size. However, in many embodiments the capsule can be relatively large. In embodiments involving hydrocarbon production, larger capsules or systems with multiple capsules can readily produce hydrocarbon products and performance comparable to or exceeding smaller systems. As an illustration, single capsules can range in size from tens of meters across to tens of acres. Optimal capsule sizes may vary depending on the type hydrocarbonaceous material inside the capsule and operating parameters, however suitable capsule areas can range from about one-half to five acres in top plan surface area. Additionally, the capsule can have a depth from about 10 m to about 50 m. In some embodiments, the capsule can define an enclosed volume of 20,500 $m^3$ to 2,000,000 $m^3$.

The permeability of the gas barrier layer can be affected by the composition of the solution of water and water-soluble polyol. Without being bound to a specific mechanism, it is believed that water molecules have a high affinity for water-soluble polyol molecules because the polyols contain multiple hydroxyl groups that are attracted to the polar water molecules. Some polyols are highly hygroscopic, meaning that they can absorb water from the atmosphere. These polyols can be mixed with water and in some cases can affect characteristics of the water. Effects that can be obtained by mixing polyols with water include, but are not limited to, increasing the boiling point over the boiling point of pure water, decreasing the freezing point under the freezing point of pure water, decreasing vapor pressure of the water at an operating temperature, decreasing evaporation rate of the water at an operating temperature, modifying viscosity of the water, and other effects. Several of these effects can improve the impermeability of the gas barrier layer.

In some embodiments, the solution of water and water-soluble polyol can have a higher boiling point than pure water. This can allow the gas barrier layer to reach a higher temperature before the solution begins to boil out of the layer. As an example, solutions of glycerin and water can have boiling points ranging from 100° C. (pure water) up to 290° C. (pure glycerin). The boiling point increases slowly in dilute solutions of glycerin and more quickly at higher concentrations. Various ratios of water and water-soluble polyol can be used. For example, one embodiment includes a solution of 60 wt % glycerin having a boiling point of 109° C. Another embodiment includes a solution of 70 wt % glycerin having a boiling point of 113.6° C. Yet another embodiment includes a solution of 80% glycerin having a boiling point of 121° C. In still another embodiment, a solution of 95% glycerin having a boiling point of 164° C. can be used. Solutions of water with other polyols can have other various boiling points. Generally, polyols that increase the boiling point of water can be used. As a general guideline, the water-soluble polyol can be present from about 10 to about 100 wt % of the solution, and in some cases from 50 to about 98 wt %.

Similarly, adding a water-soluble polyol to water can decrease the vapor pressure of the solution compared to pure water at the same temperature. This can also lead to a slower rate of evaporation of the solution from the gas barrier layer. For example, one embodiment includes a solution of 60 wt % glycerin having a vapor pressure of 565 mm Hg at 100° C. Another embodiment includes a solution of 70 wt % glycerin having a vapor pressure of 496 mm Hg at 100° C. Yet another embodiment includes a solution of 80% glycerin having a vapor pressure of 396 mm Hg at 100° C. In still another embodiment, a solution of 95% glycerin having a vapor pressure of 162 mm Hg at 100° C. can be used. If operating temperatures of the gas barrier layer are kept below 100° C. then each of these vapor pressures can be lower. Other solutions of water and water-soluble polyols can similarly have lower vapor pressures compared to pure water.

The water-soluble polyol can also depress the freezing point of water, allowing the gas barrier layer to be constructed in cold weather conditions when the temperature is below 0° C. For example, one embodiment includes a solution of 60 wt % glycerin having a freezing point of −34.7° C. Another embodiment includes a solution of 70 wt % glycerin having a freezing point of −38.9° C. Yet another embodiment includes a solution of 80% glycerin having a freezing point of −20.3° C. In still another embodiment, a solution of 90% glycerin having a freezing point of −1.6° C. can be used. Other water-soluble polyols can have similar effects on the freezing point of water.

In some cases, the water-soluble polyol can increase the viscosity of water. Viscosity of these solutions can vary depending both on the concentration of water-soluble polyol as well as temperature. Therefore, the concentration of polyol in the solution can be optimized depending on the operating temperature of the gas barrier layer and the desired viscosity of the solution. Without being bound to a specific mechanism, it is believed that increasing viscosity of the solution can increase the impermeability of the gas barrier layer because the more viscous solution can resist opening of pathways for advective fluid flow through the gas barrier layer as well as decreasing rates of diffusion through the gas barrier layer.

As explained above, different concentrations of the water-soluble polyol can provide different effects on the properties of the solution. Therefore, the concentration can be selected depending on the desired effect and the design parameters of the gas containment system. Vapor pressure of the solution tends to decrease with increasing polyol concentration. Freezing point can also decrease with increasing concentration; however, in the case of glycerin, there is a minimum in freezing temperature at a concentration of 70 wt %. Additionally, viscosity tends to increase with increasing concentration. Increasing viscosity can make the gas barrier layer less permeable, but at extremely high viscosities the solution may be more difficult to work with. All of these effects can be considered and balanced when selecting a concentration of polyol in the solution. In certain embodiments, the solution can contain from 60 wt % to 80 wt % polyol and 20 wt % to 40 wt % water. In certain other embodiments, the solution can contain from 90 wt % to 95 wt % polyol and 5 wt % to 10 wt % water. In more specific embodiments, the polyol can be glycerin.

Various water-soluble polyols can be used. Exemplary classes of suitable polyols include, but are not limited to, acyclic polyols, monoalicyclicpolyols, and cyclicetherpolyols. Suitable acyclic polyols can include glycerin, ethylene glycol, propylene glycol, diethylene glycol, and combinations thereof. In a specific embodiment, the water-soluble polyol can be glycerin.

The solution of water and water-soluble polyol can allow the gas barrier layer to exhibit diffusion controlled gas transport at the operating temperature of the gas barrier layer. Diffusion controlled gas transport refers to the characteristic of the gas barrier layer that the rate of movement of gases through the barrier is no greater than the rate of diffusion of gas molecules through the barrier. Diffusive movement of gas molecules through the barrier is differentiated from advective flow of gas through cracks or open flow pathways in the barrier. Advective flow, or advection, refers to bulk flow of the gas, and not movement of individual molecules by diffusion. For example, gas can flow through a layer of loose particulate material more easily than a layer of hydrated clay amended soil because the loose particulate material has open pathways between the loose particles for the gas to flow through. In a layer of hydrated clay amended soil with diffusion controlled gas transport, the rate of movement of gas through the layer is limited by the rate of diffusion of gas molecules through the liquid phase in the clay amended soil. In some cases, diffusion controlled gas transport can be indicated by a hydraulic conductivity of $10^{-10}$ m/s or less.

The impermeability of the gas containment system can be enhanced by adding an additional impermeable membrane layer to outer surfaces of the capsule. This layer can act as a backup barrier in the event that the gas barrier layer should fail for any reason. The membrane can also help prevent entrance of water and air from outside the capsule. The membrane can comprise a variety of impermeable coverings. In some embodiments, the membrane can be selected from high-density polyethylene liners, linear low-density polyethylene liners, polyvinyl chloride liners, polypropylene liners, chlorosulfonated polyethylene liners, ethylene propylene diene terpolymer liners, and combinations thereof. In other embodiments, the membrane can comprise a geosynthetic clay liner, woven textiles, nonwoven textiles, or combinations thereof.

As shown in FIGS. 1A-1B, a membrane layer 150 can cover the crown portion of the gas barrier layer 110. The membrane can extend across the upper surface of the crown portion, as well as partially along the interface between the gas barrier layer and the containment berms 160. In one embodiment, the membrane can extend along the interface between the gas barrier layer and the containment berms at least to the point where the gas barrier layer sidewalls become substantially vertical. Another membrane layer 155 can be placed beneath the floor portion of the gas barrier layer. This membrane can be a backup for catching any liquids that may seep through the floor of the capsule should the floor fail at any time. Thus, in some embodiments that gas containment system can include membranes on the crown portion and floor portion of the capsule, but not the sidewall portions. Without being bound to a specific mechanism, the sidewalls can be less permeable that the crown and floor portions because of greater compressive stress in the sidewalls in the vertical direction, which reduces the permeability of the sidewalls in the horizontal direction.

As mentioned above, the gas containment system can contain a particulate solid material oriented within the capsule. In some embodiments, this material can be a hydrocarbonaceous material. Hydrocarbonaceous materials can include oil shale, tar sands, lignite, bitumen, coal, peat, harvested biomass, and other materials from which hydrocarbons can be extracted. Many of these materials are characterized by the ability to produce liquid and gaseous hydrocarbons by heating the materials to elevated temperatures. For example, oil shale can be heated to temperatures sufficient to pyrolyze kerogen in the oil shale, which breaks down the kerogen into liquid and gaseous hydrocarbons with lower molecular weights. The operating temperature for producing hydrocarbons can be selected depending on the type of hydrocarbonaceous material, the desired molecular weight of hydrocarbon products, the desired phase (liquid or vapor) of hydrocarbon products, and the desired rate of production of hydrocarbon products. For example, lower temperatures can be applied for longer periods of time, or higher temperatures can be applied for shorter periods of time. In some embodiments, the temperature of hydrocarbon production can be from about 95° C. to about 500° C., and in other aspects from 200° C. to 300° C. The gas containment system can be designed so that the hydrocarbonaceous material can be heated to a hydrocarbon production temperature, while the gas barrier layer remains at a low enough temperature to retain sufficient impermeability. In one embodiment, the gas barrier layer can be maintained at a temperature that allows for diffusion controlled gas transport.

In some embodiments, the gas containment system can be operated with a positive pressure inside the capsule. For example, the pressure within the capsule can be from 1 to 2 atm absolute. These pressures can be useful for convective heating of the hydrocarbonaceous materials. At elevated pressures, gases can penetrate more readily through the gas barrier layer. Therefore, the gas barrier layer can be designed and maintained to exhibit diffusion controlled gas transport during operation of the hydrocarbon production process.

In some cases, a gas containment system can be used for hydrocarbon production over a finite period of time. In some examples the heating time can be from about 3 days to about 2 years. In other examples, the heating time can be from about 2 weeks to about 1 year. In embodiments involving production of hydrocarbons from hydrocarbonaceous material, the heating time can be sufficient to recover most of the hydrocarbons from the hydrocarbonaceous material. In one example, the heating time can be sufficient to recover at least 90% of the hydrocarbons from the hydrocarbonaceous material. Long heating times used in conjunction with moderate temperatures can in some cases produce better quality hydrocarbon products than shorter heating times with higher temperatures. In some embodiments, the gas barrier layer can be designed to maintain diffusion controlled gas transport over the course of the heating time. Although the gas barrier layer may be susceptible to eventually cracking, drying out, or otherwise become more permeable, the gas barrier layer can be designed so that this does not occur during the operational lifetime of the system.

Figure 3:
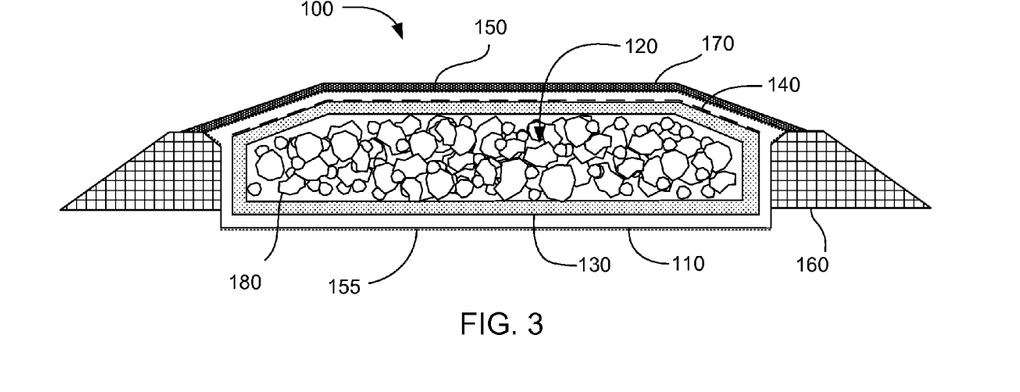
FIG. 3 is a cross-sectional side view of a gas containment system containing crushed oil shale in accordance with an embodiment of the present technology.
Figure 4:
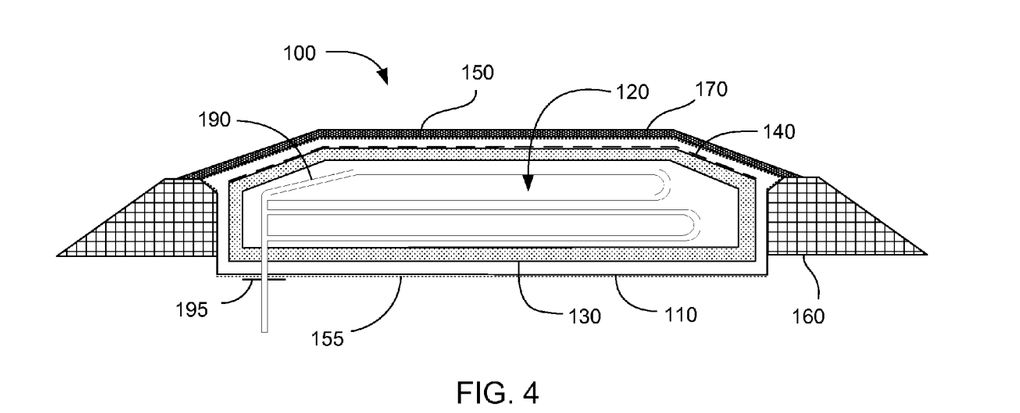
FIG. 4 is a cross-sectional side view of a gas containment system comprising heating conduits distributed within the capsule in accordance with an embodiment of the present technology.

In one particular embodiment, the gas containment system can contain crushed oil shale. FIG. 3 shows a cross-sectional side view of an embodiment in which the gas containment system 100 contains crushed oil shale 180 (not necessarily to scale). The crushed oil shale can generally be in the form of particles with an average diameter from about 1 cm to about 1 m. However, diameters from about 5 cm to 50 cm can provide good results with diameters of about 30 cm being especially useful for oil shale. As shown in FIG. 4, the gas containment system can also include heating conduits 190 penetrating the capsule to heat the interior volume 120 of the capsule. The heating conduits can enter the capsule through a bulkhead 195. These embodiments can be combined so that the gas containment system contains crushed oil shale and heating conduits for heating the crushed oil shale. The heating conduits can be used to heat the oil shale at any temperature and for any time period discussed above.

The present technology also includes embodiments in which the gas barrier layer comprises a particulate swelling clay, a non-swelling particulate material mixed with the particulate swelling clay, and glycerin, wherein the gas barrier is substantially devoid of water. The capsule can also contain a gas. In this embodiment, pure or substantially pure glycerin is used without any water content. This can allow for enhanced impermeability at high temperatures that may not be achievable with water and glycerin. For example, clay amended soil with an intrinsic permeability of $10^{-15}$ $m^2$ can maintain a hydraulic conductivity of less than $10^{-10}$ up to 100° C. when mixed with pure glycerin.

Figure 5:
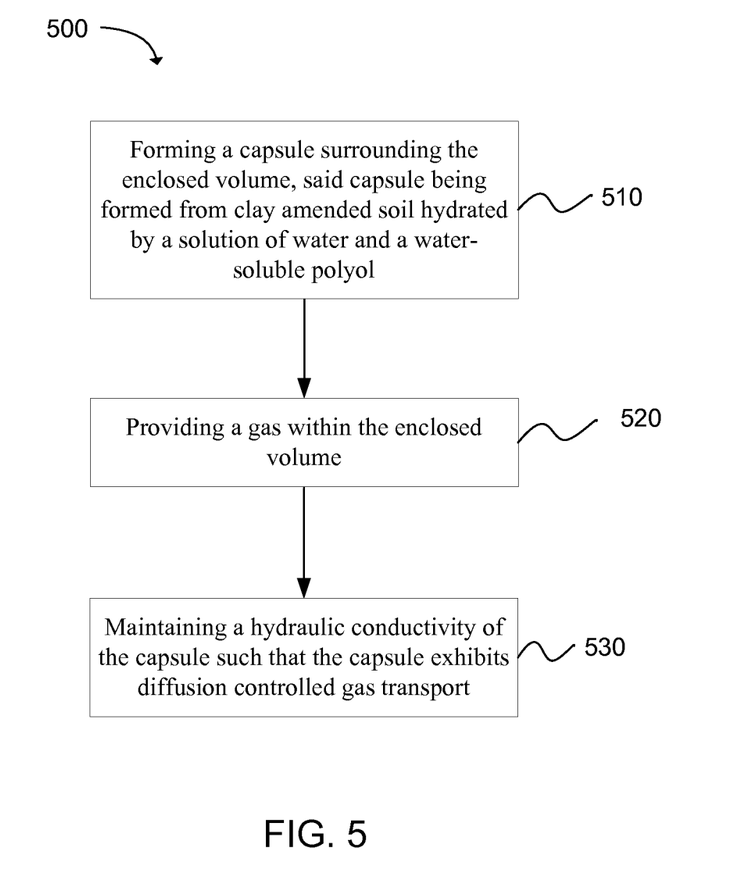
FIG. 5 is a flow chart illustrating a method of containing a gas within an enclosed volume in accordance with an embodiment of the present invention.

The present technology also encompasses methods for containing a gas within an enclosed volume. As shown in FIG. 5, a method of containing gas within an enclosed volume 500 can include forming a capsule surrounding the enclosed volume, said capsule being formed from clay amended soil hydrated by a solution of water and a water-soluble polyol 510; providing a gas within the enclosed volume 520; and maintaining a hydraulic conductivity of the capsule such that the capsule exhibits diffusion controlled gas transport 530. Generally, diffusion controlled gas transport can be maintained by maintaining the hydraulic conductivity of the gas barrier layer below $10^{-10}$ m/s. This can be accomplished by preventing formation of advective flow paths. As explained above, certain compositions of water-soluble polyols in the gas barrier layer can provide a low hydraulic conductivity so that diffusion controlled gas transport is maintained.

In a specific embodiment, the step of providing the gas can be accomplished by heating a body of hydrocarbonaceous material within the capsule to produce hydrocarbon gases from the hydrocarbonaceous material. This embodiment can involve any of the types of hydrocarbonaceous materials, operating conditions, heating conduits, inlet and outlet conduits, or other components described above.

In another specific embodiment, the method can further comprise mixing the water and water-soluble polyol in amounts selected to provide a freezing point less than about −30° C. In a further embodiment, the method can also comprise depositing the gas barrier layer at an ambient temperature below 0° C.

An additional embodiment can include maintaining the hydraulic conductivity of the capsule such that the capsule exhibits diffusion controlled gas transport by maintaining the capsule at a temperature below about 50° C.

Examples

Solutions of water and glycerin were prepared with concentrations ranging from 0 wt % to 100 wt % glycerin. Tables 1 and 2 summarize the viscosity and density, respectively, of the aqueous glycerin solutions as a function of temperature.

TABLE 1

Viscosity (centipoise) of Aqueous Glycerin Solutions

| Glycerin Percent by Weight (%) | 20° C. | 50° C. | 100° C. |
|---|---|---|---|
| 0 | 1.01 | 0.55 | 0.28 |
| 10 | 1.31 | 0.68 | — |
| 20 | 1.76 | 0.88 | — |
| 30 | 2.50 | 1.16 | — |
| 40 | 3.27 | 1.62 | 0.67 |
| 50 | 6.00 | 2.37 | 0.91 |
| 60 | 10.8 | 3.67 | 1.28 |
| 70 | 22.5 | 6.61 | 1.93 |
| 80 | 60.1 | 13.6 | 3.18 |
| 90 | 219 | 35.5 | 6.00 |
| 100 | 1410 | 142 | 14.8 |

TABLE 2

Density (g/cc) of Aqueous Glycerin Solutions

| Glycerin Percent by Weight (%) | 15° C. | 20° C. | 30° C. | 50° C. | 100° C. |
|---|---|---|---|---|---|
| 0 | 0.9991 | 0.9982 | 0.9957 | 0.9911 | 0.9796 |
| 10 | 1.0233 | 1.0221 | 1.0191 | 1.0135 | 0.9995 |
| 20 | 1.0484 | 1.0469 | 1.0435 | 1.0370 | 1.0206 |
| 30 | 1.0746 | 1.0727 | 1.0686 | 1.0606 | 1.0406 |
| 40 | 1.1015 | 1.0993 | 1.0948 | 1.0858 | 1.0635 |
| 50 | 1.1287 | 1.1263 | 1.1211 | 1.1110 | 1.0856 |
| 60 | 1.1565 | 1.1538 | 1.1483 | 1.1374 | 1.1100 |
| 70 | 1.1842 | 1.1813 | 1.1757 | 1.1643 | 1.1360 |
| 80 | 1.2116 | 1.2085 | 1.2024 | 1.1901 | 1.1595 |
| 90 | 1.2381 | 1.2351 | 1.2289 | 1.2166 | 1.1860 |
| 100 | 1.2642 | 1.2611 | 1.2550 | 1.2427 | 1.2120 |

Typically, clayey liners having a hydraulic conductivity of $1 \times 10^{-10}$ m/s or lower will exhibit diffusion controlled gas transport. Such a low hydraulic conductivity can be achieved with compacted soils that contain a high percentage by mass of swelling clay minerals in the mix. Table 3 illustrates the utility of using aqueous glycerin mixed with clayey materials to enhance the operating temperature range of glycerin and clay amended soil mixes. The tabulated permeability values are developed assuming a mix intrinsic permeability of $1 \times 10^{-16}$ m$^2$. The corresponding hydraulic conductivity is $1 \times 10^{-10}$ m/s, which ensures diffusion controlled gas transport. Based on Table 3, a 60% glycerin aqueous solution will allow the glycerin and clay amended soil mix to meet a design permeability of $1 \times 10^{-10}$ m/s for temperatures up to 100° C. For the 0% glycerin aqueous solution, the resultant mixture will exceed the design permeability ($1 \times 10^{-16}$ m$^2$) and begin to exhibit some advection gas flow for temperatures above 20° C. Summarizing, the addition of glycerin to the mix extends the maximum operating temperature from 20° C. to 100° C.

TABLE 3

Effect of Temperature and Glycerin Content on the Permeability of GCAS Mixes with $1 \times 10^{-16}$ m$^2$ Intrinsic Permeability (in m/s)

| Glycerin Percent by Weight (%) | 20° C. | 50° C. | 100° C. |
|---|---|---|---|
| 0 | $1.00 \times 10^{-10}$ | $1.82 \times 10^{-10}$ | $3.54 \times 10^{-10}$ |
| 10 | $7.89 \times 10^{-11}$ | $1.51 \times 10^{-10}$ | — |
| 20 | $6.02 \times 10^{-11}$ | $1.19 \times 10^{-10}$ | — |
| 30 | $4.34 \times 10^{-11}$ | $9.25 \times 10^{-11}$ | — |
| 40 | $3.40 \times 10^{-11}$ | $6.78 \times 10^{-11}$ | $1.61 \times 10^{-10}$ |
| 50 | $1.90 \times 10^{-11}$ | $4.74 \times 10^{-11}$ | $1.21 \times 10^{-10}$ |
| 60 | $1.08 \times 10^{-11}$ | $3.14 \times 10^{-11}$ | $8.77 \times 10^{-11}$ |
| 70 | $5.31 \times 10^{-12}$ | $1.78 \times 10^{-11}$ | $5.96 \times 10^{-11}$ |
| 80 | $2.03 \times 10^{-12}$ | $8.85 \times 10^{-12}$ | $3.69 \times 10^{-11}$ |
| 90 | $5.71 \times 10^{-13}$ | $3.47 \times 10^{-12}$ | $2.00 \times 10^{-11}$ |
| 100 | $9.05 \times 10^{-14}$ | $8.85 \times 10^{-13}$ | $8.29 \times 10^{-12}$ |

Similarly, Table 4 illustrates the effect of aqueous glycerin on the permeability of glycerin and clay amended soil with an intrinsic permeability of $1 \times 10^{-15}$ m$^2$. The corresponding hydraulic conductivity is $1 \times 10^{-9}$ m/s, which would exhibit some advection gas transport in addition to diffusion. The permeability of this hypothetical material may be too high due to either insufficient clay content or low activity clay minerals such as illite or kaolinite in the mix.

TABLE 4

Effect of Temperature and Glycerin Content on the Permeability of GCAS Mixes with $1 \times 10^{-15}$ m$^2$ Intrinsic Permeability (in m/s)

| Glycerin Percent by Weight (%) | 20° C. | 50° C. | 100° C. |
|---|---|---|---|
| 0 | $1.00 \times 10^{-9}$ | $1.82 \times 10^{-9}$ | $3.54 \times 10^{-9}$ |
| 10 | $7.89 \times 10^{-10}$ | $1.51 \times 10_{-9}$ | — |
| 20 | $6.02 \times 10^{-10}$ | $1.19 \times 10^{-9}$ | — |
| 30 | $4.34 \times 10^{-10}$ | $9.25 \times 10^{-10}$ | — |
| 40 | $3.40 \times 10^{-10}$ | $6.78 \times 10^{-10}$ | $1.61 \times 10^{-9}$ |
| 50 | $1.90 \times 10^{-10}$ | $4.74 \times 10^{-10}$ | $1.21 \times 10^{-9}$ |
| 60 | $1.08 \times 10^{-10}$ | $3.14 \times 10^{-10}$ | $8.77 \times 10^{-10}$ |
| 70 | $5.31 \times 10^{-11}$ | $1.78 \times 10^{-10}$ | $5.96 \times 10^{-10}$ |
| 80 | $2.03 \times 10^{-11}$ | $8.85 \times 10^{-11}$ | $3.69 \times 10^{-10}$ |
| 90 | $5.71 \times 10^{-12}$ | $3.47 \times 10^{-11}$ | $2.00 \times 10^{-10}$ |
| 100 | $9.05 \times 10^{-13}$ | $8.85 \times 10^{-12}$ | $8.29 \times 10^{-11}$ |

Referring to Table 4, a 60% glycerin aqueous solution would ensure diffusion controlled transport up to a maximum operating temperature of 20° C.; an 80% glycerin aqueous solution would extend the maximum operating temperature to 50° C.; and 100% glycerin would allow the material to operate up to 100° C.

Summarizing, the addition of glycerin to the preceding soil mix lowers the permeability from an unacceptable to acceptable level and extends the maximum operating temperature.

Table 5 lists freezing points for aqueous solutions of glycerin from 0 wt % to 100 wt %.

TABLE 5

Freezing Point of Aqueous Glycerin Solutions

| Glycerin by Weight (%) | Water by Weight (%) | Freezing Point (° F.) |
|---|---|---|
| 0 | 100 | 32.0 |
| 10 | 90 | 29.1 |
| 20 | 80 | 23.4 |
| 30 | 70 | 14.9 |
| 40 | 60 | 4.3 |
| 50 | 50 | −9.4 |
| 60 | 40 | −30.5 |
| 70 | 30 | −38.0 |
| 80 | 20 | −4.5 |
| 90 | 10 | 29.1 |
| 100 | 0 | 62.6 |

The lower freezing points and heat of hydration of glycerin enables winter construction of gas barrier layers at temperatures as low as −38° F. and continuous construction of gas barrier layers during winter months in cold climate regions.

It is to be understood that any description of gas containment systems contained herein can also be applied to methods for containing a gas within an enclosed volume. Similarly, any description of the methods can also be applied to the systems. Therefore, all materials, dimensions, compositions, and other elements described with respect to gas containment systems can also be used in methods for containing a gas. Any steps, procedures, processes, and other elements of methods for containing a gas can also be applied to gas containment systems.

The described features, structures, or characteristics may be combined in any suitable manner in one or more examples. In the preceding description numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A gas containment system comprising:
   a gas barrier layer forming a capsule, the gas barrier layer comprising:
      a particulate swelling clay;
      a non-swelling particulate material mixed with the particulate swelling clay;
      water hydrating the particulate swelling clay and forming a continuous liquid phase in the gas barrier layer; and
      a water-soluble polyol dissolved in the water; and
   a gas retained inside the capsule.

2. The gas containment system of claim 1, wherein the particulate swelling clay is selected from the group consisting of bentonite clay, montmorillonite, kaolinite, illite, chlorite, vermiculite, and combinations thereof.

3. The gas containment system of claim 1, wherein the non-swelling particulate material is selected from the group consisting of soil, sand, gravel, crushed rock, crushed spent oil shale, and combinations thereof.

4. The gas containment system of claim 1, wherein the water-soluble polyol is selected from the group consisting of glycerin, ethylene glycol, propylene glycol, diethylene glycol, and combinations thereof.

5. The gas containment system of claim 1, wherein the water-soluble polyol comprises glycerin.

6. The gas containment system of claim 1, wherein the water-soluble polyol is glycerin and the water and glycerin are present in the barrier layer at a ratio of 20-40% water and 60-80% glycerin.

7. The gas containment system of claim 1, wherein the water-soluble polyol is glycerin and the water and glycerin are present in the barrier layer at a ratio of 5-10 wt % water and 90-95 wt % glycerin.

8. The gas containment system of claim 1, further comprising a flexible impermeable membrane covering outer surfaces of the capsule.

9. The gas containment system of claim 8, wherein the flexible impermeable membrane is selected from the group consisting of high-density polyethylene liners, linear low-density polyethylene liners, polyvinyl chloride liners, polypropylene liners, chlorosulfonated polyethylene liners, ethylene propylene diene terpolymer liners, and combinations thereof.

10. The gas containment system of claim 1, further comprising a particulate solid material oriented within the capsule.

11. The gas containment system of claim 10, wherein the particulate solid material is selected from the group consisting of oil shale, tar sands, lignite, bitumen, coal, peat, harvested biomass, and combinations thereof.

12. The gas containment system of claim 10, wherein the particulate solid material is oil shale.

13. The gas containment system of claim 1, further comprising heating conduits penetrating the capsule to heat an interior volume of the capsule.

14. The gas containment system of claim 1, wherein the gas barrier layer comprises about 6-12 wt % swelling clay, about 15-25 wt % of a solution of the water and the polyol, and the remainder non-swelling particulate material.

15. The gas containment system of claim 1, wherein the gas barrier layer exhibits diffusion controlled gas transport.

16. The gas containment system of claim 1, wherein the capsule defines an enclosed volume of 20,500 to 2,000,000 $m^3$.

* * * * *